April 17, 1962     L. B. READ     3,030,085
FUEL CIRCUITS FOR AIR-BLED CARBURETOR Filed May 22, 1959     8 Sheets-Sheet 1

*INVENTOR.*
LELAND B. READ
BY
*Laurence M. Goodridge*
ATTORNEY

*INVENTOR.*
LELAND B. READ
*BY*
Laurence M. Goodridge
ATTORNEY

April 17, 1962 L. B. READ 3,030,085
FUEL CIRCUITS FOR AIR-BLED CARBURETOR
Filed May 22, 1959 8 Sheets-Sheet 3

INVENTOR.
LELAND B. READ
BY
Laurence M. Goodridge
ATTORNEY

April 17, 1962 L. B. READ 3,030,085
FUEL CIRCUITS FOR AIR-BLED CARBURETOR
Filed May 22, 1959
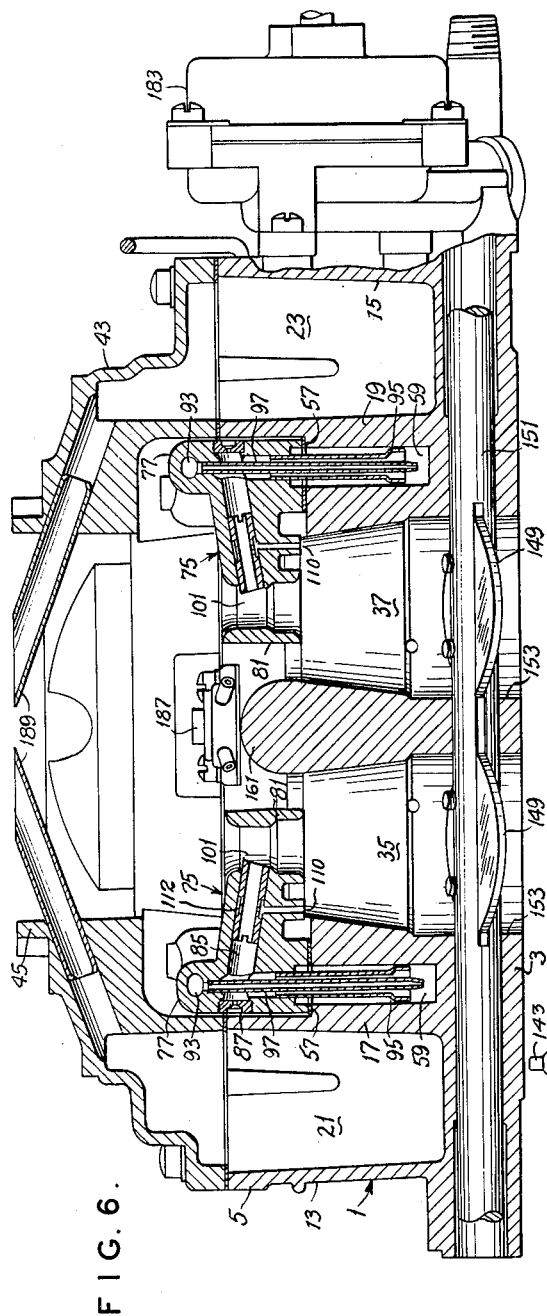
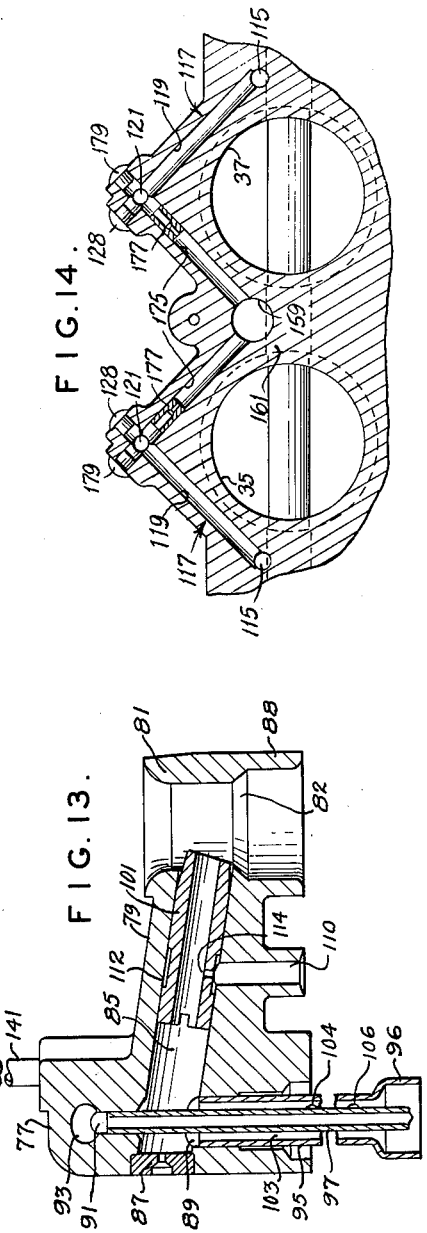
INVENTOR.
LELAND B. READ
BY
Lawrence M. Goodridge
ATTORNEY

INVENTOR.
LELAND B. READ

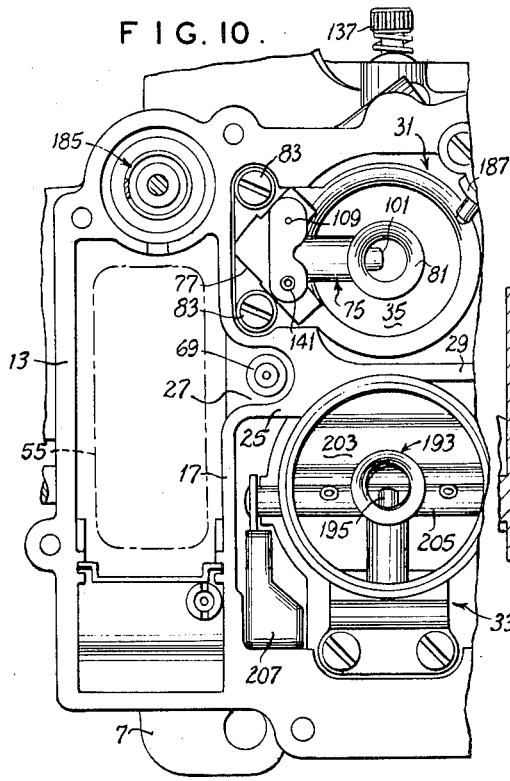
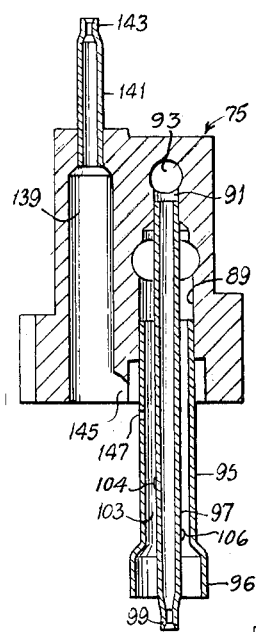
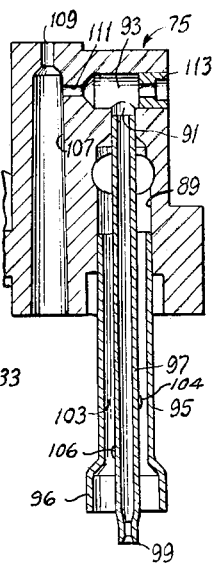
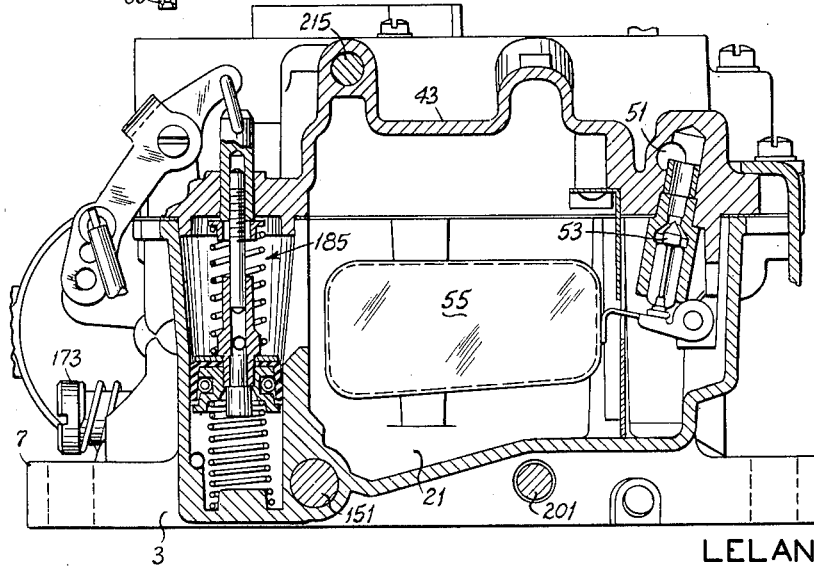

INVENTOR.
LELAND B. READ
BY
Laurence M. Goodridge
ATTORNEY

INVENTOR.
LELAND B. READ
BY
Laurence M. Goodridge
ATTORNEY

3,030,085
FUEL CIRCUITS FOR AIR-BLED CARBURETOR
Leland B. Read, Florissant, Mo., assignor to ACF Industries, Incorporated, New York, N.Y., a corporation of New Jersey
Filed May 22, 1959, Ser. No. 815,207
9 Claims. (Cl. 261—41)

This invention relates to carburetors for multi-cylinder internal combustion spark ignition engines, and more specifically to a carburetor so constructed as to be capable of a calibration to closely approach the minimum fuel flow requirements of such an engine, regardless of the induction flow characteristics created by single operation tending to upset the calibration. The invention as hereinafter disclosed applies to a V-8 engine and carburetor, and the statements made herein relate to discoveries relative thereto, but these engine conditions are not regarded as unique, and can be found in some degree regardless of engine type or number of cylinders.

It has been discovered after much engine testing that, in order to approach the maximum efficiency in fuel economy of which the high compression engine is capable, and still maintain smooth performance from the engine, it is necessary to meter the fuel flow in a way, as well as at a rate, which the engine demands. It may be stated as a truism that all engines of this type have a pulsating flow in the induction system, some more so than others. The degree of pulsation can be due to factors such as the number of cylinders, intake manifold design, valve timing (valve overlap), compression ratio, etc. These tests indicate that change in the character of the flow is very noticeable in the carburetor when the throttles are opened beyond a certain degree. With the throttles closed, or nearly closed, however, the throttling effect of the throttle valves damps out most of the pulsation in the mixture conduit of the carburetor, so that it is no longer noticeable in the carburetor above the throttle valves. In other words, as the throttles of the carburetor are closed, the character of the air inflow to the carburetor changes from a pulsating flow to a nearly steady flow. Obviously, since the character of the flow changes, there is a transition zone between steady flow and pulsating flow. The transition will occur within a well defined range of throttle positions and engine speeds for any particular engine. Since these two variables will determine manifold pressure, it is convenient to fix the transition zone in this manner rather than in degrees of throttle opening. (It is well understood in the art that manifold pressure increases with throttle opening at any given engine speed.)

By way of example, in a motor car engine of well known make, the transition zone in induction air inflow becomes pronounced at about 9 inches Hg manifold suction pressure drop in an engine speed range of from 2000 to 2600 r.p.m. at a car speed in the range of 65 to 70 m.p.h., and at a mass air inflow to the carburetor of 7½ pounds of air per minute. At this rate of air inflow through the carburetor, the fuel flow is divided between the high speed fuel metering circuit and the low speed fuel metering circuit, being approximately .60–.40. If the carburetor step-up or vacuum meter for fuel enrichment is set to operate at less than 12 inches of manifold suction pressure, the mixture becomes too rich in this range, but, on the other hand, if the vacuum meter step-up for fuel enrichment is set for economy to operate at manifold suction pressures less than 9 inches Hg, then the mixture becomes too lean, and engine surging occurs, even though the carburetor, when accurately flow tested at steady flows, shows no lean condition. Engine surge is an engine condition of irregular firing (late or early) between cylinders (a lean mixture burns slower than a rich mixture). The cause of mixture variation is attributed to changes from steady flow condition due to engine pulsations.

At the same range of engine and car speeds, but at higher manifold pressures (a lower range of manifold suction pressures from 9 inches Hg to 5 inches Hg), the same economy calibration for the carburetor, carefully checked by accurate flow tests to be correct, actually delivered a mixture too rich under pulsating flow conditions, thus illustrating the effect of pulsating flow on the fuel nozzles of the fuel metering circuits.

These discoveries support the conclusion that accurate calibration of the standard form of four-barrel carburetor by flow testing to reproduce the exact required curves for fuel-to-air ratio for engine demand cannot be relied upon to produce satisfactory engine performance. Engines are sensitive to the way the fuel is supplied, as well as to the rate at which the fuel is supplied. Carburetors for such engines cannot approach a maximum economy calibration with satisfactory performance (without surge) unless fuel metering circuits are constructed to match fuel metering to induction system flow conditions.

Based upon this evidence deduced from experiment, it was assumed that, at manifold suction pressures of 9 inches Hg and below (9 inches Hg—18 inches Hg plus), the density of the mixture (based on air density at these suction pressures), and consequently the mass of the mixture in the manifold is low, so that pulsations produce no appreciable mixture change measured in percent. Thus, a steady flow of fuel is acceptable to the engine under these conditions because the small percent of pressure change has little effect upon fuel metering in the low speed fuel metering circuit of the carburetor.

At some range of lower manifold suction pressures, however, percent of pressure change and the mass (based upon air density in the manifold) increases to the point where $$\frac{MV^2}{2g}$$

becomes significant. Thus, the flow past the throttle is no longer approximately steady, and consequently the downstream pressure oscillation affecting the fuel metering in the low speed circuit of the carburetor is no longer insignificant. Consider, however, the relative mass and inertia of fuel with respect to that of air, and it will immediately be realized that the conventional low speed fuel metering circuit of a carburetor will tend to be lean because the fuel flow lags behind the air flow on each pulsation. This suggests that the metering of the fuel must compensate for the inertia of the fuel in order to maintain the calibrated ratio of pounds of fuel per pounds of air, or the fuel flow velocities be increased with each pulsation.

According to this invention, the carburetor is provided with a novel low speed fuel metering circuit in which the metering tends to compensate for the inertia of the fuel which heretofore has effected a change in the fuel-to-air ratio because of the change in the character of the air inflow to the engine induction system from a steady condition to a pulsating condition. Actually, the carburetor according to this invention shows the same ratio of fuel flow under contrasting conditions of air flow, and, when tested in a flow machine, there is no change in the rate of fuel delivery from a standard carburetor fuel metering low speed circuit.

At and beyond the transition point, the high speed fuel circuit is subjected directly to pulsating flow. Opening the throttle increases the direct action because it decreases the throttling effect. Here, again, it was discovered that the inertia of the metered fuel affects the rate of fuel flow, first, because the downstream metering pressure at the nozzle tip is a fluctuating one under unsteady flow conditions. As a result, this tends to cause a siphoning (continued fuel flow after a transitory low pressure pulse). Thus, the mixture becomes too rich at certain pulse frequencies. Secondly (at higher engine speeds and corresponding higher pulse frequencies), because the inertia of the fuel slows the air flow through the venturi (fuel has zero velocity in the direction of air flow as it leaves the tip of the nozzle), a lean condition is experienced. This, in turn, suggests that metering in the high speed carburetor metering circuit must tend to compensate for the inertia of fuel, so that the fuel will be delivered as the engine demands, and that the effect of fuel inertia on the air stream after it is discharged from the nozzle be minimized.

According to this invention, a novel high speed fuel metering circuit is provided for the carburetor in which the velocities of fuel flow are modulated by fluctuation in downstream metering air pressures. The effect of pulsating metering pressures is damped to some extent in one range of air inflow to the carburetor (at the transition point especially), and venturi arrangement is modified so that the rate of fuel flow more closely approximates the demand of the engine whether the flow is steady or unsteady.

Turning now to general carburetor theory, it can be broadly stated with respect to all carburetors that the fuel metering is performed by a fuel flow restriction of some kind, usually referred to as a jet, and a pressure drop across the fuel flow restriction, but the manner of operation of these metering restrictions in high and low speed metering circuits for a carburetor are entirely different, one from the other, in the manner of creating or utilizing the metering pressure drop. In the high speed circuit, the so-called pressure drop at the throat of the usual air flow measuring venturi increases with the rate of air flow. The rate of fuel flow varies in the same way as the pressure drop; consequently, the flow of fuel increases and decreases with corresponding increase and decrease in the rate of air flow. Thus, pulsating air flow conditions will produce, at certain engine speeds, objectionable pulsations in the metered fuel flow, upsetting the carburetor calibration in the high speed circuit, due to the difference heretofore mentioned between the mass and inertia of the fuel in the fuel stream compared to the mass and inertia of the air in the air stream. Small forces or differences in pressure will produce large changes in the air stream rate of flow, but nowhere near as rapid or as large a change in the fuel stream rate of flow. Besides, there is the objectionable lag in the fuel stream due to inertia, as well as a tendency to siphon.

It is the object of this invention to construct a high speed fuel metering circuit which will flow exactly the same amount of fuel to the amount of air during steady and unsteady air flow conditions. To do this, the high speed metering circuit is designed so that the portion of the fuel stream downstream of the metering restriction is converted to a light emulsion, and bleeds are provided forming jets of air to accelerate the flow. In addition, at least one air bleed is provided in the high speed circuit adjacent the nozzle tip, which is exposed to the pulsating flow at a different location from the tip of the nozzle located in the primary venturi. In the transition between steady and unsteady flow conditions in the air stream, the flow through the bleed will pulsate out of phase to damp the effect of unsteady air flow on the fuel flow; but, although its damping action continues at greater throttle openings when the air flow changes completely to an unsteady state, its action supplements that of the nozzle tip to accelerate or modulate fuel flow.

The conventional low speed fuel metering circuit does not operate the same as the high speed fuel metering circuit, even though the theory of fuel metering employed in both may be basically identical. In the low speed fuel metering circuit, one nozzle, or idle port, as it is usually called, is located below the throttle. Usually other nozzles in the form of a plurality of ports, or in the form of a single slot, are arranged at the opening edge of the throttle so as to be successively uncovered to manifold pressure by the initial throttle tip-in. The location of the ports is such that they are converted from atmospheric bleeds as they are exposed to the pressures downstream of the throttle during throttle opening. The pressure downstream of the throttle, of course, is substantially manifold pressure. From what has been said heretofore, it will be realized that manifold pressure has a tendency to increase with throttle opening. Thus, increase in metered fuel flow in the low speed fuel metering circuit with increase in air flow is accomplished, broadly speaking, by exposing more nozzle or port area to manifold pressure, rather than atmospheric pressure above the throttle. As the throttle is opened, therefore, metered fuel flow from the low speed fuel metering circuit will increase, and then decrease as the air flow increases. The decrease will occur after the throttle is opened beyond a point uncovering all of the ports. If the carburetor had only this metering circuit, it would operate only in the low range of throttle openings, possibly up to 5 or 10 degrees of throttle opening. However, some fuel will always flow in the low speed fuel metering circuit so long as manifold pressure is substantially below atmospheric pressure.

At the transition, the amount of suction pressure to which these ports are subject may be in the range from 7 inches to 11 inches Hg, so it will be readily recognized that, with this much downstream metering pressure drop, fuel is still flowing from the low speed fuel metering circuit. It has been estimated that this rate of flow is about 60 percent of the total fuel requirements. Consequently, at the transition, the rate of fuel flow in the low speed fuel metering circuit is still a significant factor, and the results on metering (a tendency toward leanness at the transition) caused by unsteady air flow conditions can be attributed in part to the low speed fuel metering circuit. It has been discovered that a relocation of the idle air bleed in the low speed fuel metering circuit tends to counteract this leanness tendency, and that, for this purpose, the bleed can be located at a point opposite the opening edge of the throttle corresponding with the transient condition of air flow (in this specific construction for this particular application, about 35 degrees). In this location, which is in the actual throttling zone, the bleed will shrink at each increase on each pulsation, and vice versa, thus to match fuel flow with every transient condition of air flow.

These changes in the high and low speed fuel metering circuits result in fully satisfactory engine performance on fuel-air ratios necessary for maximum economy. A full power mixture is not necessary in the normal usable speed range, so that a vacuum meter or step-up for fuel enrichment with a setting of 5 inches Hg manifold suction pressure becomes possible. This setting is far below the limit heretofore regarded as necessary in a carburetor for the particular engine selected here as an example. It is very seldom that even on acceleration in the speed range up to 70 m.p.h. manifold suction pressure decreases below 5 inches Hg (manifold pressure increases above minus 5 inches Hg). A full rich mixture for power is therefor seldom required by the average drive, thus contributing substantially to tank mileage in the usual driving range.

The invention is here illustrated in the primary barrels of a four-barrel carburetor, which is regarded as the best mode contemplated by the inventor for carrying out his invention, but is will be understood that the invention is equally applicable to single- or multi-barrel types of carburetors.

Further objects and advantages of the instant invention will appear from a reading of the detailed description hereinafter included taken in conjunction with the accompanying drawings, in which:

FIG. 6 is a sectional view in elevation taken along the line of 6—6 of FIG. 5;

FIG. 9 is a section in elevation taken along the line 9—9 looking in the direction of the arrows;

FIG. 10 is a fragmentary top plan view showing one primary and one secondary barrel with the fuel bowl cover air horn casting removed;

FIG. 11 is a section taken in elevation along the line 11—11 of FIG. 5 looking in the direction of the arrow;

FIG. 12 is a section taken through the nozzle cluster along the line 12—12 of FIG. 5 looking in the direction of the arrows;

FIG. 13 is a sectional view taken in elevation through the primary nozzle cluster along the line 13—13 of FIG. 5 looking in the direction of the arrows;

FIG. 14 is a transverse sectional view taken through the carburetor along the line 14—14 of FIG. 8 looking in the direction of the arrows;

Corresponding reference characterers in the several views indicate corresponding parts.

*Engine Fuel Supply System*

Figure 1:
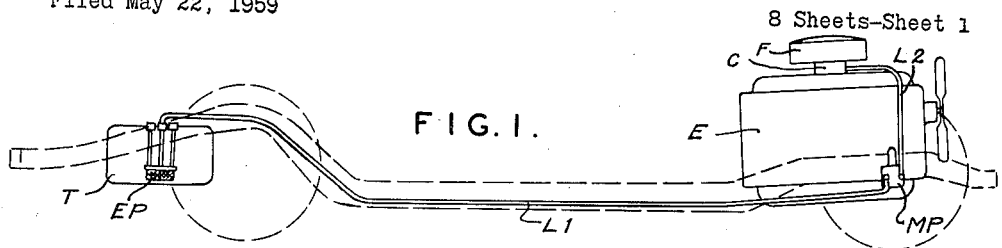
FIG. 1 is a view in side elevation illustrating a motor car vehicle chassis with an engine and carburetor.
Figure 2:
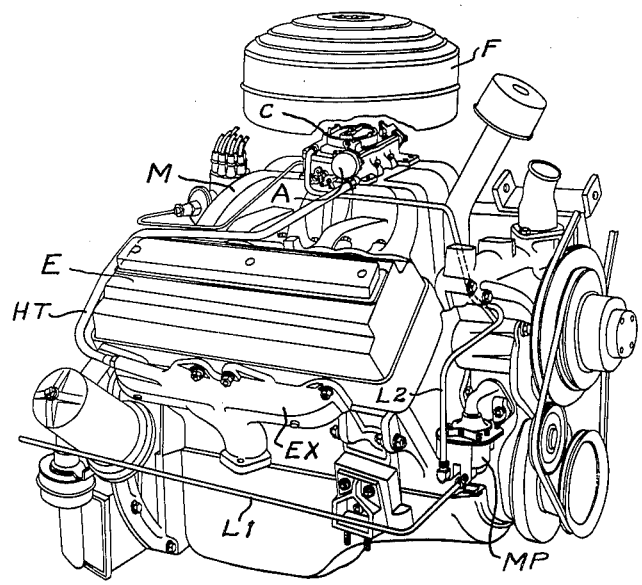
FIG. 2 is a perspective view of the V–8 engine and carburetor shown in FIG. 1.

Referring to the drawings, FIG. 1 shows a chassis for a motor car, mounting at its forward end an engine E on which is a carburetor C. The carburetor C has an air filter F on the air horn thereof. The opposite end of the vehicle chassis mounts a fuel tank T, and fuel is supplied to the carburetor C from the fuel tank T through a fuel line L1 which may be connected with an electric fuel pump EP suspended in the fuel tank, or it may be supplied by gravity feed. The opposite end of the fuel line L1 may connect with a mechanical fuel pump MP which is of the diaphragm type operated by the engine crankshaft. Line L2 connects the outlet of the fuel pump MP with the inlet to the carburetor C, all as shown in FIG. 2. According to the illustration in FIG. 2, the carburetor C is a four-barrel type having two primary mixture conduits and two secondary mixture conduits mounted on an intake manifold of the dual type indicated as M, with the two primary barrels toward the front of the engine and the two secondary barrels toward the rear. An air filter F is connected to the air horn of the carburetor C.

As shown in FIG. 2, the carburetor C has an automatic choke mechanism such as A, which is supplied heated air through a heat tube such as HT connected at one end with a stove on the exhaust manifold EX and at its opposite end with the automatic choke temperature responsive means A.

The opposite side of the carburetor shown in FIG. 3 has a throttle mechanism (which will be later described), including a primary throttle shaft and lever connected by a rod R to the usual accelerator pedal of the motor vehicle, so that depressing the accelerator will open the primary throttles. Closing movement is effected by the control spring S.

Figure 3:
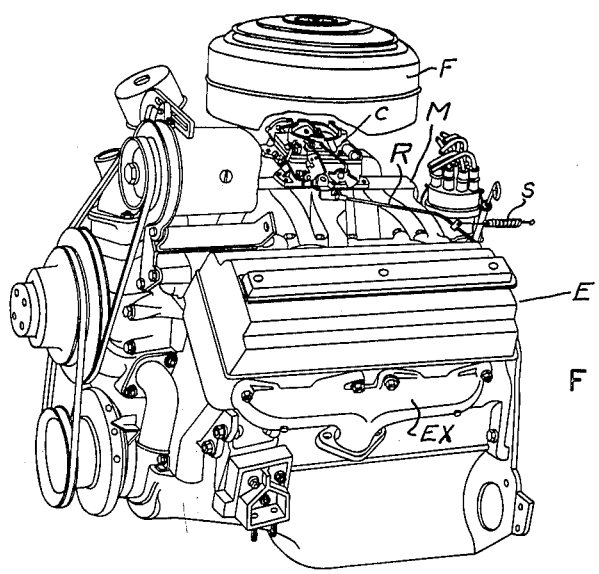
FIG. 3 is a perspective view of the other side of the engine and carburetor.

As hereinbefore stated, the engine is a V–8 engine with four cylinders in the left bank such as shown in FIG. 3, and four cylinders in the right bank as shown in FIG. 2. The intake manifold M is of the dual type and consists of a longitudinal runner and four branches, two of which connect with the end cylinders in one bank, and two of which connect with the center cylinders in the opposite bank. The other portion of the dual manifold has similar connections to the remaining cylinders, and a longitudinal runner parallel to the first supplying these branches, which is usually located below the first runner, as well as to one side.

The carburetor C, as will be pointed out hereinafter, has two primary barrels located side by side, one of which is connected with one of the runners of the dual manifold, and the other connected with the other runner. The secondary barrels are similarly connected, one with each runner of each manifold. In effect, therefore, the carburetor C has a primary and a secondary barrel connected to four of the cylinders of the engine, and a primary and secondary barrel connected with the other four cylinders of the engine. The firing order of the engine is so arranged that the intake strokes alternate from one primary barrel to the other, so that the intake pulsations in a primary and its corresponding secondary would be 180 degrees apart as determined by crankshaft rotation. Each primary, therefore, can be considered a separate carburetor supplying fuel to four cylinders. Of course, the secondaries function in a like manner when they come into operation. There may be balance passages between the manifolds, but it is obvious that the carburetor will be subject to distinct pulsations the same as if it were connected with a four-cylinder engine, for example.

Since, as heretofore pointed out, each primary serves four cylinders, the broad principles involved in this invention can perhaps be best understood by considering how the invention would be applied to a single-barrel carburetor such as commonly used on four- or six-cylinder engines. For this reason the invention is diagrammatically illustrated in FIG. 4 as applied to a single-barrel carburetor. This figure is a schematic representation, and the following detailed description is directed thereto, and also to the application of the invention to a multi-barrel, multi-stage carburetor operating on the principles described and illustrated in FIG. 4.

*Construction of Single-Barrel Carburetor*

Figure 4:
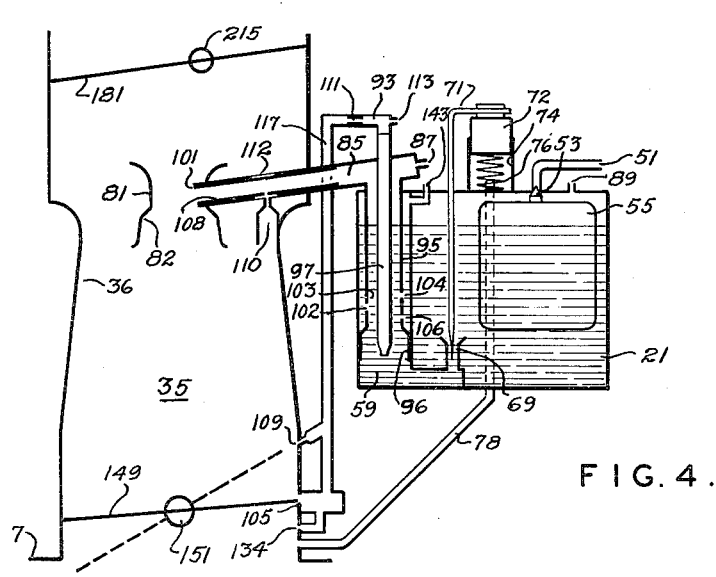
FIG. 4 is a diagrammatic illustration of a carburetor showing a mixture conduit and fuel bowl, throttle, high and low speed fuel circuits, etc., illustrating schematically the modification in the high and low speed fuel metering circuits according to this invention.

Referring specifically to FIG. 4, the carburetor diagrammatically illustrated therein has a mixture conduit 35 controlled by a throttle 149 on the rotatable shaft 151 journaled in the walls of the mixture conduit 35. The throttle is located adjacent the outlet of the carburetor and, as indicated, the carburetor has a flange 7 by which it is fastened to the manifold of the engine. In the mixture conduit 35 is a primary or boost venturi 81 and a secondary or main venturi 36, and, as there illustrated, the boost venturi is of a special design having a wide-angle diffuser section 82 adjacent the throat, which diffuser section has a practically cylindrical skirt foreshortened and terminating in the throat of the main venturi 36.

The inlet to the mixture conduit 35 is controlled by the usual choke valve 181 mounted on a rotatable shaft 215 journaled in the air horn section of the walls of the mixture conduit 35. It is understood that the choke valve 181 is closed only for starting at temperatures where it is necessary to enrich the fuel mixture. When the engine is running, it assumes a partially or fully open position depending upon engine temperature.

Mounted beside the mixture conduit 35 is a fuel bowl 21 which is provided with a fuel supply connection 51 controlled by the float 55 and needle valve 53 so as to maintain a constant head of fuel in the fuel bowl of the carburetor. Adjacent the bottom of the fuel bowl 21 is a main fuel passage 59 which is supplied with fuel from the fuel bowl 21 through a metering jet 69 controlled by a metering rod 71. Piston 72 of the vacuum meter or step-up device, as they are commonly referred to, reciprocates in a cylinder and is connected at its upper end to the rod 71, so as to move the rod 71 into or out of the metering jet 69 in response to changes in manifold pressure communicated to the bottom of the cylinder 74 through the pipe 78. In this particular carburetor, the size of the piston 72 and spring 76 is such that the rod 71 is held in its lowermost position with the spring 76 compressed by manifold suction pressures of 5 inches Hg or lower (manifold pressures in the range of minus 5 inches Hg to minus 18 inches Hg plus).

Main fuel passage 59 terminates in a vertical well which is vented to atmosphere at 143. The well supplies fuel to both the high speed fuel metering circuit and the low speed fuel metering circuit. The former includes a fuel tube such as 95 having a bell mouth 96 with a slidable fit with the walls of the well so constructed as to prevent substantial gasoline leakage between the outer wall of the fuel tube 95 and the inner walls of the well adjacent the bell mouth portion thereof at 96. The upper end of the fuel tube 95 connects directly with an overhead type of fuel nozzle 85 which extends to a tip portion 101 exposed in the boost venturi 81. The tip portion of the nozzle 101 contains a sleeve 108 which is grooved at 112 so as to form a circumferential passage internally of the nozzle 85, perforations at the bottom of the groove 112 communicate between the bleed 110 and the fuel within the nozzle 85.

The bleed 110 is an aspirating type of bleed and, accordingly, opens downstream in the direction of air flow through the mixture conduit 35. The bleed has an open lower end terminating in the zone between the exit of the diffuser section of the boost venturi and the throat of the main venturi 36. Actually, the bleed tube, or tube part of the bleed, is recessed in a groove formed in the surface of the throat of the main venturi 36. Above the normal fuel level in the fuel bowl is a bleed 87 located to direct a jet of air axially of the fuel nozzle passage 85. Below the normal fuel level in the fuel bowl, the fuel tube is provided with several holes indicated as 102, 104, and 106, all of which will allow the well to fill to the normal fuel level under static conditions when the main nozzle is not operating, but will convert to air bleeds after the nozzle starts to flow.

*Operation of High Speed Fuel Metering Circuit*

During operation of the high speed fuel metering circuit, there will be, of course, a decided drop in pressure created by constriction of the streamlines in the throat 81 of the boost venturi. This will be augmented by the aspirating effect of the main venturi 36 on the flow through the boost venturi; i.e., the discharge pressure at the outlet of the diffuser section of the boost venturi is not substantially free stream pressure. Actually, at significant rates of flow it will be lower, approximately the same as stream pressure at the main venturi throat.

This drop in pressure acting downstream of the metering restriction 69 will cause a certain metered flow of fuel through the jet 69 depending on velocity (pressure drop) in the throat of the primary venturi 81. Because of the construction of the high speed metering circuit, the fuel is initially about the level indicated in the fuel well, so that the nozzle will be easy starting, so to speak. However, after the nozzle gets into operation, the fuel level in the well 59 will drop, draining out the fuel in the space between the fuel tube and the wall of the well forming an air passage to the bleeds 102, 104, and 106, which are uncovered and remain so. The fuel supply is stable in this condition. The depression at the throat of the venturi then causes a circulation of air from the inflow bleeds 87, 143, and 110. This circulation is controlled by the relative sizes of the bleed 87, 143, and 110, so that a light emulsion is formed in the high speed metering circuit downstream of the metering jet 69 by the circulation of air in the bleed 143 and through the perforations 102, 104, and 106 in the fuel tube. The light emulsion rises to the top of the tube where it is subject to the jet stream of air coming through the bleed 87, causing the fuel to be accelerated toward the nozzle tip. The acceleration is aided by the addition of air by the bleed 110 at a point in the nozzle where the fuel and air tend normally to separate. The discharge from the tip of the nozzle 101 is maintained as an emulsion by the system of bleeds, and the several paths of circulation set up between the nozzle tip and each of the bleeds in turn maintain the fuel in an emulsified state to the tip of the nozzle. Preferably, each of these paths is progressively of higher velocity. As the flow through the nozzle of the high speed circuit increases due to increase in the air flow, the function of the bleed 110 changes, due to the fact that it is disposed in a direction to be aspirated by the accelerating flow in the throat section of the main venturi 36 passing the exit of the diffuser section from the boost venturi 82. This aspirating effect sets up a new circulation in which the air moves from the bleeds 143 and 87 through the high speed metering circuit of the main nozzle, not only to the nozzle tip 101, but also to the bleed 110. This is possible whenever the pressure at the outlet of the bleed 110 becomes substantially subatmospheric. Therefore, if intermittently the pressure at the outlet of the bleed 110 is lower than at the nozzle tip 101, the action of the bleed 110 will cause the fuel to continue to flow in the same direction toward the tip of the nozzle, regardless of fluctuations in pressure at the tip due to pulsations.

These pressure fluctuations caused by unsteady inflow will, however, upset fuel metering if the action of the bleeds is not maintained uniform. It has also been discovered that oscillation of the fuel level in the well can occur, which may result in nonuniformity in metering, and may be one of the principal causes. Heretofore, bleeds in the fuel tube have been located above, as well as below, the fuel level under static conditions. The proper solution, it has been discovered, seems to be a construction wherein the lower end of the fuel tube 95 is dimensioned to contact with the walls of the well 59, and one in which the bleeds are located below the fuel level under static conditions (contact does ont have to be fluid-tight). After the nozzle starts to function, the bleeds 102, 104, and 106 remain uncovered, and fuel supply is stabilized. This construction retains the advantage of easy starting, but also maintains uniform flow characteristics under variable flow conditions. It is regarded, therefore, as definitely superior to prior construction.

It should be noted here that under no circumstances so far observed does the bleed 110 ever convert to a fuel nozzle. All of the fuel is discharged at the nozzle tip 101, and flows with the air stream through the diffuser section of the boost venturi, which has a very sharp initial diffuser angle at 82.

The sharp diffuser angle has been found to minimize the inertia effect of fuel discharge from the nozzle tip on the flow of air through the boost venturi.

The arrangement of the bleeds in this construction of the high speed fuel metering system forms an emulsion downstream of the metering restriction, which emulsion is maintained as a substantially constant condition (density) to the tip and nozzle. The weight of the emulsion, of course, is less than solid fuel because of the change in density due to the admixture thereto of air, and the presence of air in the circuit negatives any siphoning effect—that is, for the fuel to overrun the changes in negative pulsating pressure at the throat of the boost venturi 81. There will be no solid fuel present at any time during operation of the high speed fuel metering system except when the nozzle starts to flow. The discharge to the tip is an emulsion.

Because the high speed fuel metering circuit flows an emulsion, the velocity of flow will be much greater than if flowing solid fuel, and, of course, the faster the flow, the less effect transient pressure changes in the primary venturi have on the metering, and what little effect there might be, if any, is damped out by the action of the bleed 110.

At higher speeds, above the transition, when air inflow to the carburetor changes to a pulsating flow with a frequency corresponding to engine speed, the action of the high speed metering circuit, and particularly the bleed 110, changes, and the bleed 110, because of its location (being exposed to aspirating effects of air flow) tends to produce an aspirating action out of phase with that of the nozzle, damping pulsating pressures adjacent the nozzle tip, so that the flow of fuel is continued and oscillations in the fuel flow from nozzle 85 are damped out. In other words, the suction on the nozzle 85 tends to be substantially continuous at all frequency ranges due to the tendency of a circulation to be set up from the inlet bleeds 87 and 143 to the bleed 110, as well as the nozzle tip 101, so that the action of the bleed 110 supplements the action of suction at the nozzle tip 101.

The out-of-phase action also tends to double the effect of pressure change frequencies in the throat of the boost venturi because of the aspirating relationship, extenuating each transient change in negative pressure at the nozzle tip 101. Because of the difference in inertia between fuel flow and air flow, this extenuating effect modulates the normal tendency of the fuel flow to lag behind changes in air inflow.

Each of the features incorporated in the high speed fuel metering circuit coact to produce a metering system which is not upset by changes from steady to unsteady flow.

Low Speed Fuel Metering Circuit

Within the well 59 is an idle tube 97 with a metered or restricted inlet projecting downwardly in the fuel well below the fuel level. The idle tube 97 forms part of an inverted U-tube which extends upwardly to a cross passage 93, which in turn connects with a downwardly extending leg 117, which is an idle fuel passage connected with ports 134 and 105 below the throttle and adjacent the edge thereof, respectively. The cross passage contains an economizer 111 and a by-pass bleed 113, but does not necessarily need an idle bleed located immediately adjacent the downstream side of the restriction 111, as is the usual case. Instead, the idle bleed is located at 109 in a position approximately opposite the edge of the throttle 149 when opened to the 35-degree position, which corresponds with a manifold pressure of about minus 9 inches Hg in an engine speed range of from 2000 to 2600 r.p.m. at a car speed in the range of from 65 to 70 miles per hour, and at a mass air inflow to the carburetor of 7½ pounds of air per minute for this particular engine, which has been chosen as exemplary.

Operation of Low Speed Fuel Metering System

During operation of the engine in the idle speed range with the throttle 149 closed, the port 134 will be subject to manifold suction, causing a circulation of air from the bleed 109 to the port 134, and a distinct drop in pressure downstream of the metering restriction 111. In response to this drop in pressure, fuel is siphoned from the well 59 by the idle tube 97, mixed with air entering the bleed 113, metered by the economizer jet 111, and discharged down the leg 117, where it is picked up by a fast circulation of air between the bleed 109 and the port 134, so as to be rapidly discharged in the form of a spray from the port 134. Due to the fact that the port 105 is covered by the throttle during idle, or substantially covered, there will also be a circulation of air between the port 105 and the port 134. Fine adjustment of the mixture discharged from the port 134 can be controlled by the usual needle valve hereafter described in the actual carburetor, but omitted here for the purpose of simplification.

As the throttle 149 is gradually opened, the port 105 is uncovered to manifold suction in a progressive manner. This, in turn, decreases the inflow of air through the port 105 into the idle passage, and, of course, may initiate some discharge of fuel from the port 105. When the port 105 is totally uncovered by the throttle, it also will increase the discharge of fuel by supplementing the discharge from the port 134 so as to maintain correct mixture ratio as the air inflow past the throttle increases. The fuel flow, therefore, will gradually increase as the port 105 is uncovered by opening movement of the throttle and progressively exposed to manifold pressure. However, beyond this point, the flow through the idle system would naturally tend to decrease with increases in manifold pressure, and it is usually before this point is actually reached that the main nozzle begins to function, supplementing the discharge from the idle system. In other words, the length of the port 105 is adjusted so as to cover the transition point between the flow from the idle system and the flow from the main nozzle. However, when the throttle has reached about a 35-degree opening, according to this selected example, the aforementioned transition zone is reached in which the flow past the throttle begins to change to an unsteady condition. This is perhaps more distinct at and below the throttle than above the throttle. The air bleed 109 is located opposite the edge of the throttle at this degree of opening, and when so located it becomes a shrinking bleed in the sense that it is subject to pressure fluctuations with pulsations in air flow around the edge of the throttle valve. Thus the bleed 109 becomes an intermittent shrinking bleed having a distinct effect upon the circulation of air between the bleed 109 and the ports 134 and 105. As its bleeding effect is cut down during the pulsation by the drop in pressure at the edge of the throttle 149, the effect is to enrich the discharge from the ports 134 and 105 and vice versa. At the end of the pulsation, the bleed takes up its normal function as an atmospheric bleed to lean out the mixture discharged from the ports 105 and 134. In this manner the fuel flow is matched to air flow. At steady flows past the throttle, such as used during calibration of the carburetor, the port 109 continues to function in the normal manner. It is only during unsteady flows that it shows this tendency to compensate.

Actual Carburetor Construction

The following paragraphs describe an actual construction in a carburetor embodying the teachings broadly disclosed and above discussed. The following constructions disclosed actual carburetors as now contemplated which incorporate a high speed fuel metering system such as above described, as well as a low speed fuel metering system as above described, illustrating the exact manner in which the teachings of this invention can be applied to a modern carburetor of standard design.

According to FIG. 6, carburetor C comprises a main body casting 1 which is formed to provide a throttle body section 3 and a float bowl section 5 on the throttle body section. The throttle body section 3 has lug 7 for attachment to the intake manifold of the engine on which the carburetor is used. The float bowl section is generally of rectangular shape in plan, its side walls being designated 9 and 11 and its end walls being designated 13 and 15. Partitions 17 and 19 extend between the side walls 9 and 11 adjacent the end walls 13 and 15 to define two float bowls 21 and 23, one at each end of the fuel bowl section 5. Each of the partitions 17 and 19 has a central inwardly directed offset 25 providing a vertically extending recess such as indicated at 27. A partition 29 extends between offsets 25 dividing the space bounded by side walls 9 and 11 and partitions 17 and 19 into a primary section 31 and a secondary section 33. The primary section is formed to provide two side-by-side primary mixture conduits or barrels 35 and 37, and the secondary section is formed to provide two side-by-side secondary mixture conduits or barrels 39 and 41. Each primary barrel is formed as a venturi. Secured to the top of the fuel bowl section is a float bowl cover 43 formed to provide a circular air horn 45. The horn has a diametrical partition 47 coplanar with partition 29 dividing it into a primary air inlet 31a above section 31 and a secondary air inlet 33a above section 33.

The cover 43 has a fuel inlet 49 and an inlet passage 51 connecting the inlet to the two float bowls 21 and 23. Entry of fuel to the bowls from passage 51 is controlled by two float valves 53, one for each bowl (see FIG. 9). Each of these valves is controlled by a float 55 in the respective bowl. The valves and floats may be of any suitable construction, their details not being critical so far as this invention is concerned. The bowl 21 supplies the barrel 35 and the bowl 23 supplies the barrel 37 via identical systems. Only the system for barrel 35 will be described, and it will be understood that the system for barrel 37 is identical.

Barrel 35 has an upwardly facing shoulder 57 at the side thereof toward the respective float bowl 21 (see FIG. 6). Extending down from this shoulder is a vertical well 59. The casting 1 is formed with a passage 61 from the bottom of recess 27 of bowl 21 to the bottom of the well 59. This passage is formed by drilling a vertical hole 63 extending down from the bottom of recess 27 to an intersection with an inclined hole 65 drilled from the bottom of throttle body section 3 to the lower end of the well. The outer end of hole 65 is plugged as indicated at 67. Threaded in the upper end of hole 63 is a metering jet 69. A metering rod 71 extends down in recess 27 and through the jet from a vacuum-responsive control contained in the float bowl section 5 under a cap 73. The metering rod and control are of known construction and need not be further described, details thereof not being critical so far as this invention is concerned. It will be understood that the control for the rod acts to move the metering rod up and down in response to change in intake manifold vacuum, for high speed fuel metering.

Both primary barrels have a shoulder 57 serving to support a nozzle cluster or body 75 (see FIGS. 6, 10, 11, 12, and 13), both of which are identical. The basic casting forming the nozzle cluster or body has a head 77, an arm 79 extending outwardly and downwardly from the head, and a primary or boost venturi 81 at the outer end of the arm or extension 79. Note that the boost venturi 81 is formed with a wide-angle diffuser 82 which merges into a skirt 88 having substantially parallel cylindrical walls. A nozzle cluster is secured on the shoulder 57 by suitable screws such as 83 threaded into the body casting of the carburetor through holes in the nozzle body. Hole 85 is drilled lengthwise of the extension 79 to open into the boost venturi 81. The inlet end of this passage is closed by a bleed restriction 87 having a press fit in the nozzle body. The passage 85 is angled downwardly from the horizontal so as to form an overhead type of nozzle, and a hole 89 is drilled vertically from the bottom of the nozzle cluster or body into the head 77 to intersect the drilled hole 85. A smaller hole 91 forms a continuation of the vertical hole 89 coaxial therewith to intersect a horizontal cross passage 93 drilled horizontally through the head 77 adjacent its upper end (see FIG. 12).

A fuel tube 95 has its upper end pressed in the hole 89, and this tube 95 extends downwardly below the normal fuel level in the well 59. Preferably, the lower end of the tube 95 is bell-mounted at 96 to form a tight sliding fit with the side walls of the well 59, and its lower end is provided with suitable bleeds such as 102, 104, and 106.

Idle tube 97 has a press fit in the hole 91 and extends coaxially of the fuel tube 95 to a point below the fuel level in the well 59. Tube 97 has a restricted lower open end 99, as illustrated. A nozzle tube 101 is pressed into the hole 85 in the extension or arm 79, and forms a nozzle tip projecting into the throat of the boost venturi 81. Tube 101 has a circumferential groove on its exterior face 112 which, in turn, is provided with apertures 114. The passage formed by the circumferential groove 112 in turn communicates with the aspirating type of bleed 110.

The space 103 between the tubes 95 and 97 provides a fuel passage for the high speed fuel metering circuit, which in turn connects with passage 85 and nozzle tube 101, which discharges at the throat of the boost venturi 81. Air is supplied to the passages or apertures 102, 104, and 106 by an atmospheric bleed 143 (see FIG. 11) in the tube 141 which projects upwardly through a hole 145 in the air horn casting, so as to be exposed to atmospheric pressure below the air cleaner. The passage 139 has an opening supporting the tube 141, and this in turn connects with a slot 145 at the top of the fuel well 59.

Figure 8:
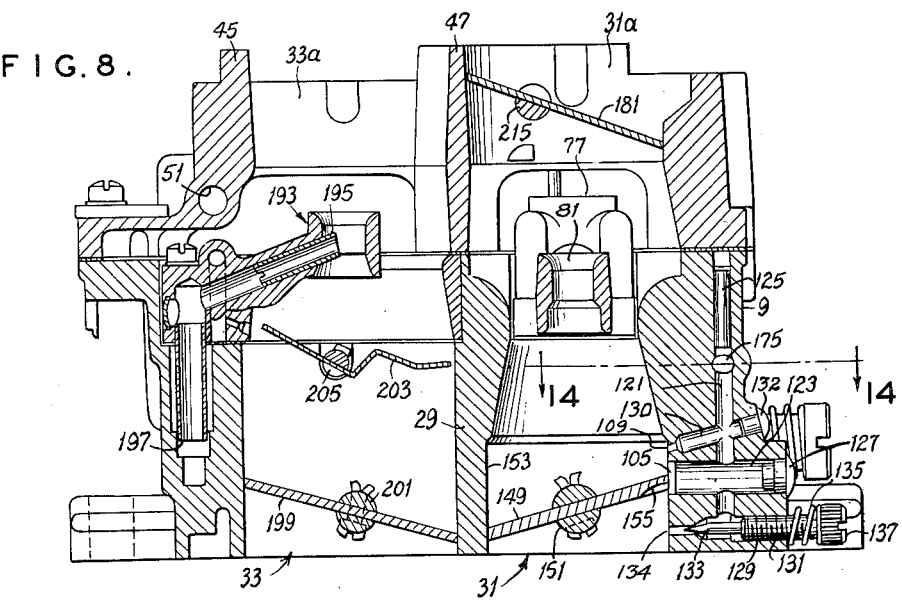
FIG. 8 is a section taken in elevation along the line 8—8 of FIG. 5 looking in the direction of the arrows.

Idle orifice tube 97 is part of a low speed fuel metering circuit for delivering fuel at low speed operation or small throttle openings to idle port 134. This low speed fuel metering circuit also includes passages 91 forming an extension from the tube 97, cross passage 93, and downwardly extending passage 117, which in turn includes registering vertical passage 115, horizontal passage 119, and vertical passage 121, to the idle port 134 (see FIG. 5 for the passages, and FIG. 8 for the location of the port).

The open end of cross passage 93 is plugged by a metering restriction 113 pressed into place in the nozzle casting. The opposite end of passage 93 has a calibrated economizer 111, so that the fuel flows from the nozzle tube into the passages 93, 107, 115, 119, and 121, all of which form an inverted U-tube of the low speed fuel metering circuit. (The circuits for both primaries are identical.) At the lower end of the passage system 117 in the vertical part 121, there is an intersecting drilled passage 131 threaded at 129 to receive the idle screw 137 which has a tapered metering end 133 in the inner end of the port 134.

Above the passage 134 is a parallel passage 123 drilled from the outside inwardly, intersecting the passage 121. This, in turn, is plugged at its outer end 127 and communicates with a slot 105 at the edge of the throttle 149. A third drilled passage 130 extends to a metered bleed 109 in the wall of the mixture conduit opposite the throttle edge when open about 35 degrees. The outer end of the passage 130 is suitably plugged at 132 (see FIG. 8).

Each of the primary barrels 35 and 37 has a primary throttle valve 149 (see FIGS. 6 and 8) at its lower end, the two primary throttle valves being fixed on a primary throttle shaft 151 journaled in the throttle body section. Each primary throttle bore is designated 153. Each throttle valve, when at dead idle, is fully seated around its perimeter on the bore, and is grooved on the bottom as indicated at 155 on the side toward the idle port 105 to provide a restricted opening from the idle port into the throttle bore when the throttle valve is fully seated. The main body casting 1 is formed with a by-pass designated in its entirety by the reference character 157 (see FIGS. 5 and 7) for by-passing air for idling from the upper end of the primary section 31 to the primary throttle bores 153 below the primary throttle valves 149. As shown, this idle air by-pass 157 is common to the two primary barrels, being constituted by a vertical hole 159 extending downward in the portion 161 of casting 1 between the primary barrel 35 and 37 to an intersection with a horizontal hole 163 extending inward from side wall 9 of the casting, and a vertical hole 165 extending up from the bottom of the casting 1 to hole 163 and offset outward from the hole 159. An idle air adjusting screw 167 is threaded in the horizontal hole 163. This screw has an unthreaded inner end portion 169 which traverses the upper end of the hole 165, and is adapted to be threaded in or out to vary the size of the opening from hole 163 into hole 165. A coil compression spring 171 surrounds screw 167, reacting from side wall 9 against the head 173 of the screw.

Horizontal holes 175 (see FIG. 5) are drilled approximately at right angles to the horizontal holes 119 intersecting the latter and extending to the vertical hole 159 which constitutes the upper part of the idle air by-pass 157 upstream from (above) the idle air adjusting screw 167. These holes 175 thus serve to interconnect the two idle mixture passages 117, and the idle air by-pass 157, with the connection to passages 117 at points downstream (below) economizers 111 and air bleeds 109 therefor, and with the connection to by-pass 157 at a point upstream from (above) the idle air adjusting screw 167. Pressed in each of the holes 175, and located between the vertical holes 121 and 159, is a restriction jet 177. The outer end of each hole 175 is plugged as indicated at 179.

In the primary air inlet portion 31a of the air horn 45 is a choke valve 181 fixed on choke shaft 215. The carburetor has the usual accelerator pump such as indicated at 185 in FIG. 9 for supplying fuel to the primary barrels in response to opening of the primary throttles via a pump discharge jet cluster indicated at 187 in FIGS. 4–6. Vents such as indicated at 189 are provided for venting the float bowls to the interior of the air horn 45.

Figure 7:
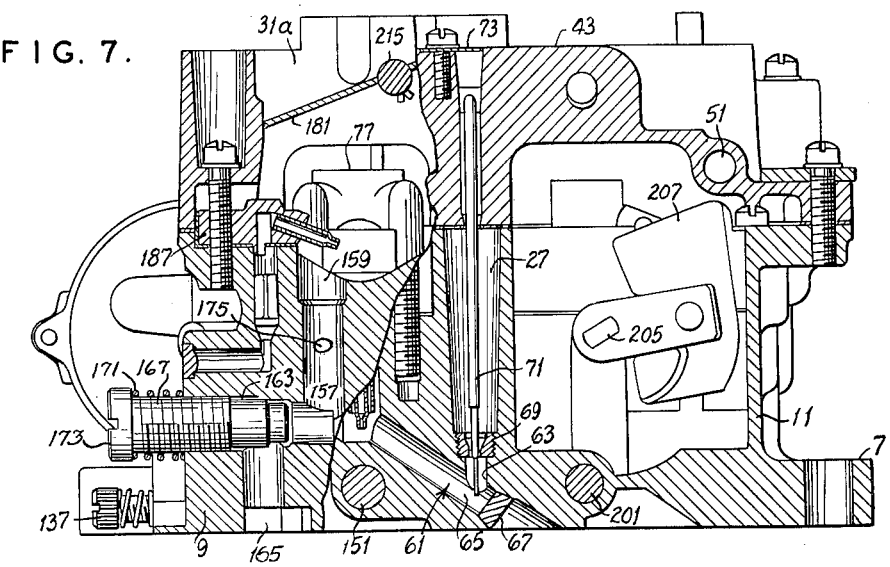
FIG. 7 is a sectional view in elevation taken along the line 7—7 of FIG. 5 looking in the direction of the arrows.

At the upper end of each secondary barrel 39 and 41 is a venturi cluster 193 having a fuel nozzle 195 supplied with fuel from the respective float bowl via a passage part of which is indicated at 197 in FIG. 7. Each secondary barrel has a secondary throttle valve 199 at its lower end, the two secondary throttle valves being fixed on secondary throttle shaft 201 journaled in the throttle body section 3. Each secondary barrel also has a velocity valve 203 therein, the two velocity valves being fixed on shaft 205 which carries weights such as indicated at 207 (FIGS. 6 and 8) for biasing the velocity valves closed.

It will be understood that, at dead idle, the primary throttle valves 149 are fully seated in the primary throttle bores 153. As to each of the primary barrels 35 and 37, fuel for idling is supplied from well 59, metered through the idle orifice tube 97, and then passes through holes 91 and 93, economizer passage 111, idle mixture passage 117, and thence through idle port 105 and port 134. Air entering hole 93 through the metering plug 113 initiates atomization of the fuel, and the flow of the air-fuel mixture is accelerated in passing through the economizer 111. Air entering hole 107 through the bleed hole 109 leans the mixture and accelerates its delivery to the idle port 134. The holes 175 contitute metering passages interconnecting the upper part (the inlet side) of the idle air by-pass 157 to the two idle mixture passages 117 for the two primary barrels 35 and 37, and act to supply air from the by-pass 157 to the idle mixture passages 117. This air constitutes a further part of the air for the idle mixture, additive to the air supplied through metering plug 113 and bleed hole 109. All this air constitutes part of the air required for idling the engine. Additional air for idling passes directly through the idle air by-pass 157. Some further air for idling may be supplied by leakage of air such as may occur past the primary and secondary throttle valves, around the throttle shafts, etc.

The amount of air bled through metering passages 175 into the idle mixture passages 117 is dependent upon the rate of flow of air through the idle air by-pass 157. The rate of flow through the latter is dependent upon the setting of the idle air adjusting screw 167. With increased flow of air through by-pass 157, the pressure at the ends of passages 175 toward the by-pass 157 decreases. Thus, with increased flow of air through by-pass 157, bleeding of air through passages 175 into the idle mixture passages 117 decreases, and the mixture supplied through passages 117 richens up to compensate for increased air flow through by-pass 157 (which would otherwise lean the mixture supplied to the engine).

Accordingly, adjustment of the idle air adjusting screw 167 within relatively wide limits has no effect on the idle mixture ratio, since backing off the screw 167 results in reducing the bleeding of air through passages 175 and advancing the screw 167 results in increasing the bleeding of air through passages 175. Consequently, once the idle fuel adjusting needles 133 have been set to obtain the proper idle mixture for any given idle speed of the engine, it is possible to change the speed over a relatively wide range simply by adjusting the idle air adjusting screw 167, without any necessity for resetting the idle fuel adjusting needles. Moreover, adjustment of the idle air adjusting screw 167 even over a relatively wide range (four to five turns of the screw with the construction as herein illustrated) has little effect to change the mixture ratio supplied by the idle system at off idle and early part throttle. Thus, the passages 175 provide such compensation as to maintain the mixture ratio at the desired value throughout the entire idle delivery (including off idle and early part throttle), and eliminate the leaning effect on the mixture which would be present in a system without such passages in the off idle and early part throttle range.

The compensation for idle air by-pass screw adjustment above described has no effect at all upon the function of the bleed ports 109 on the fuel supplied at the transition zone between pulsating and steady flow conditions. As above explained, these ports function in a normal manner as an air bleed so long as the throttle is in the idle or just off idle range, say 5 or 10 degrees. The compensation effected by the ports 109, as above explained, occurs in a condition in which pulsating flow exists below and around the throttle, but the primary nozzle, which is then in operation, is subject to substantially a steady condition of air flow.

Fixed on the left end of the primary throttle shaft 151 are inner and outer primary throttle arms 209 and 211. The outer primary throttle arm carries a fast idle adjusting screw 213 engageable with a fast idle cam 215 pivoted at 217 on the left side of the float bowl section 5 of the carburetor. The fast idle cam 215 is overbalanced so as to be gravity-biased to tend to rotate in clockwise direction as viewed in FIG. 18 from an initial fast idle position (cold engine) to a normal warm engine idle position. The cam 215 has a starting step 219 opposed to and engageable by the screw 213 when the cam is in fast idle position for blocking the primary throttle valves 149 open a predetermined amount to determine a fast idle position of the primary throttle valves, intermediate steps 221 successively opposed to and engageable by the screw upon rotation of the cam for blocking the primary valves open lesser amounts.

Figure 19:
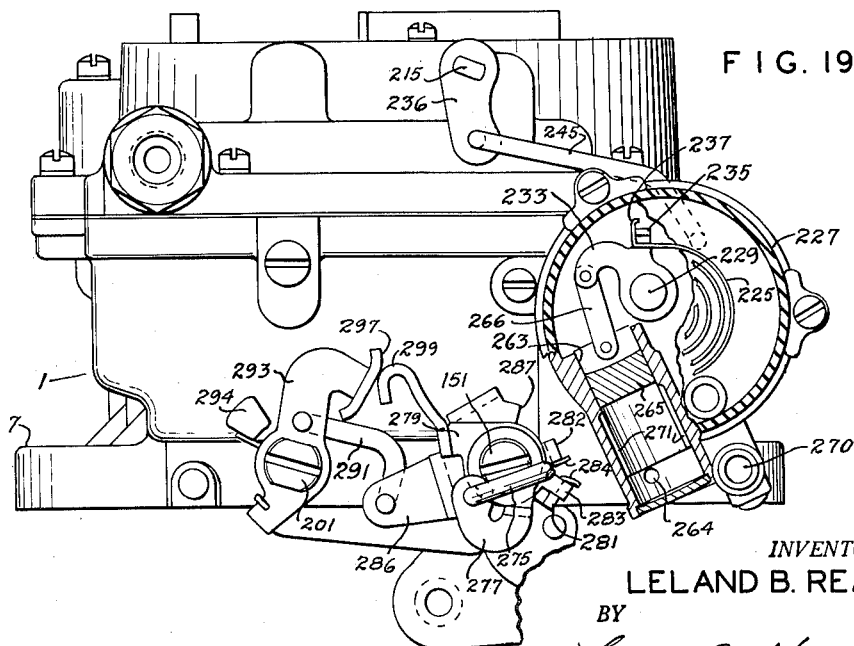
FIG. 19 is a side elevation of the carburetor shown in FIG. 5, corresponding to the side of the carburetor illustrated in FIG. 2.

The position of the fast idle cam 215 is controlled by means responsive to engine temperature and suction, and includes a thermostatic coil 225 contained in a coil housing 227 shown as mounted on the righthand side of the carburetor (see FIG. 2 and FIG. 19, for example). The thermostatic coil 225 is a spiral coil having its center secured to a shaft 230 projecting outwardly from the coil housing 227 from the front thereof. Extending from the rear of the housing is a rotatable shaft 229 (see FIG. 19 and FIG. 5). A sleeve 231 surrounds one end of the shaft 229 and supports the casing 227. A crank arm 233 extends radially from the shaft 229 and is secured to the inner end thereof within the housing 227. At the outer end of the arm 233 is a crank pin or hook 235 which is engaged by a complementary shaped hook formation 237 at the outer free end of the thermostatic coil 225. The latter is coiled in such a way that, with the crank 233 stationary, it acts as a spring tending to rotate the arm 233 in a clockwise direction as viewed in FIG. 19, and the shaft 229 tends to rotate clockwise therewith. This occurs as the temperature of the carburetor or temperature within the housing 227 connected with a stove drops. As the temperature in the housing increases, however, the coil 225 tends to wind up, moving hook 237 away from the hook 235 to reduce the spring force acting on pin 235 and the arm 233.

Assuming that the engine is cold, and the coil 225 under tension, shaft 229 in sleeve 231 is rotated in a clockwise direction by the spring effect of the thermostat. This, in turn, tends to rotate the crank 230 in the same direction, and tension link 245 to rotate crank arm 236 and shaft 215, closing the choke valve 181.

Figure 18:
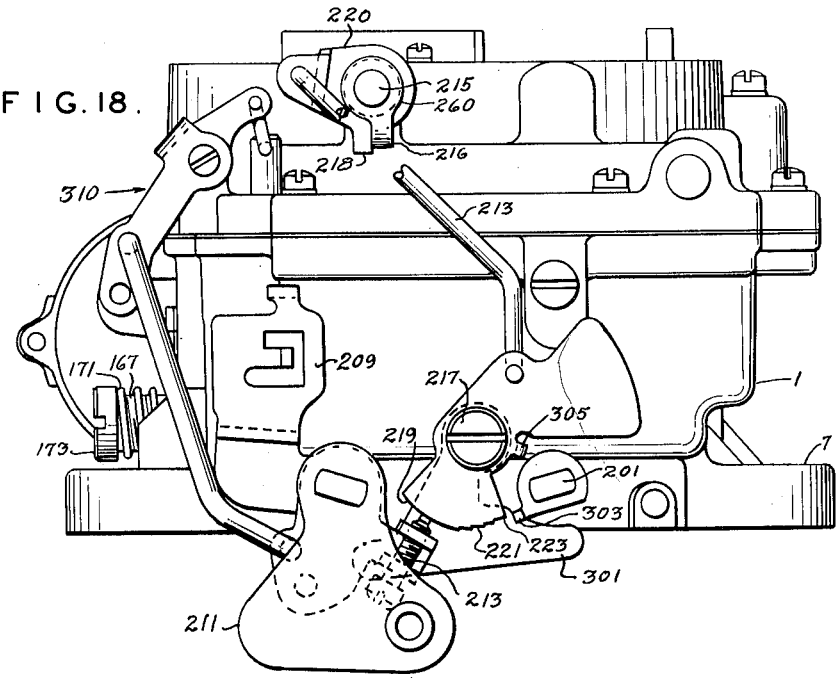
FIG. 18 is a side elevation of the carburetor shown in FIG. 5, and corresponds with the showing in FIG. 3.

On the opposite end of the choke shaft 215 is a fixed lever 260 having a free end 216 engaging with a lug 218 on a loose lever 220 rotatable on the shaft 215. Connected with the lever 220 is a link 213 extending to a pivoted connection with the fast idle cam 219. Thus it can be seen that, as the choke valve is closed, the fast idle cam is moved into the position shown in FIG. 18, provided the throttle lever and idle set screw are out of the way. This means that, when the throttle is open, the choke valve can close and the fast idle cam move into an active position. On the other hand, the lost motion connection 216, 218 permits the choke valve to open without moving the fast idle cam. When the primary throttle lever is moved to a partially open position to relieve the pressure 213 on the fast idle cam, gravity will move the fast idle cam in a clockwise direction as far as the position of the choke valve permits. Of course, when the engine is fully warmed up, this means that the fast idle cam can move to its inactive position. This will occur when the coil 225 is fully heated.

Also pivoted on the shaft 217 is a latch 301 which is biased by gravity into active engagement with a lug 303 on the secondary throttle shaft 201. The fast idle cam, in turn, carries a lug 305 engageable with a shoulder on the latch 301 as the fast idle cam moves to the full off position, so as to release the latch 301 and permit operation of the secondary throttles in a manner hereinafter described.

Figure 5:
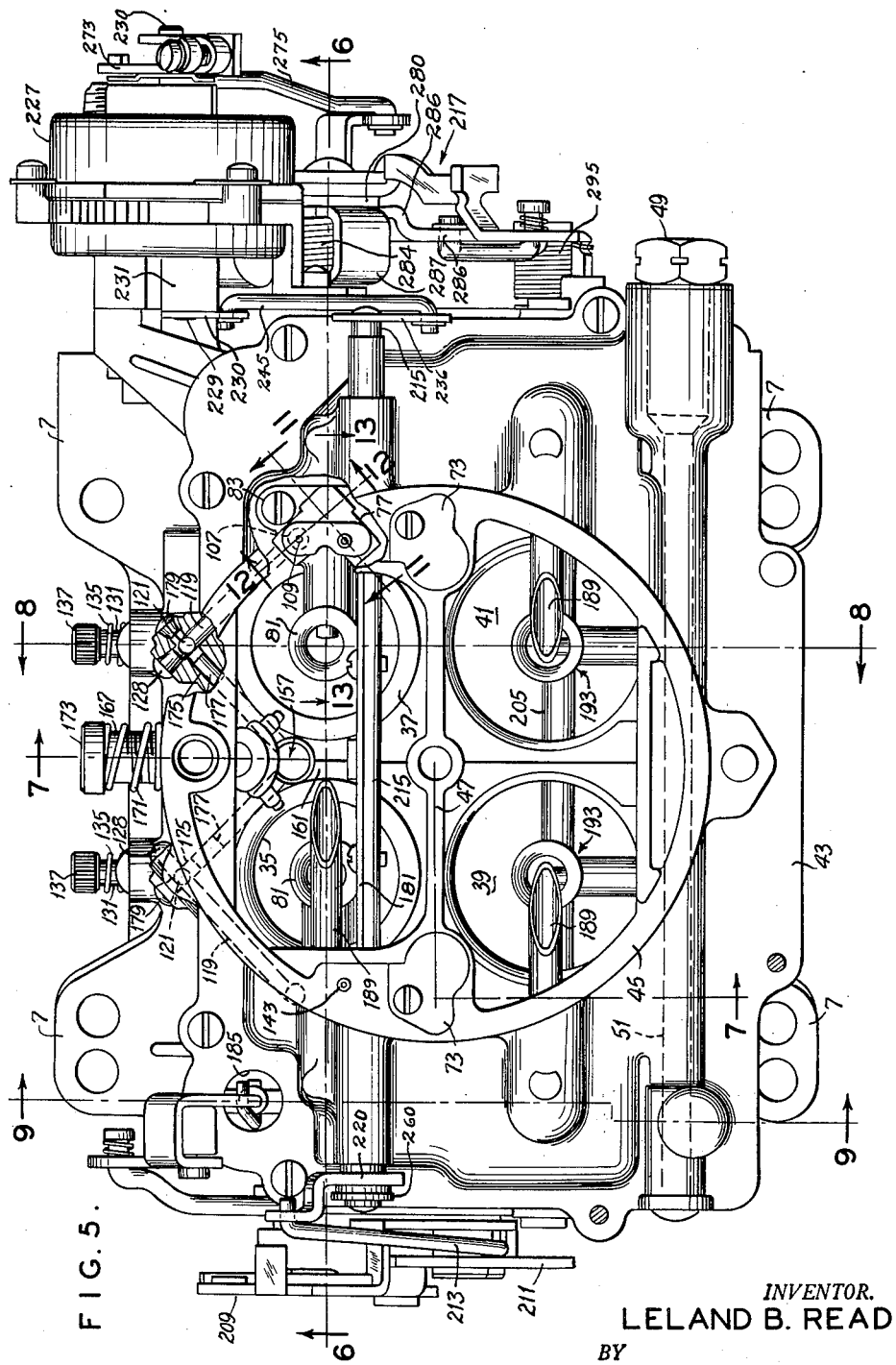
FIG. 5 is a top plan view of a four-barrel multistage carburetor.
Figure 15:
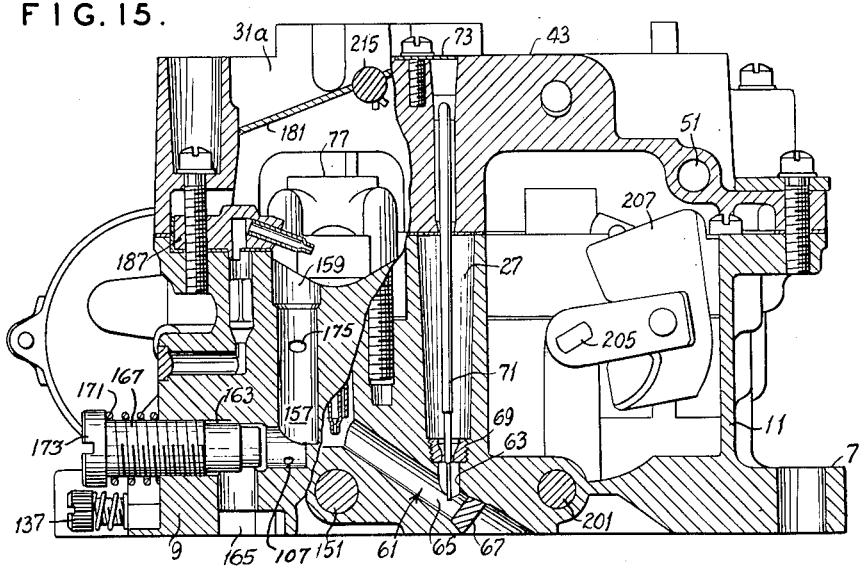
FIG. 15 is a section taken in elevation and corresponds generally with that shown in FIG. 7, but illustrates a second form of the invention.

The choke valve 181 is adapted to swing between the closed position in which it is illustrated in FIG. 15, to a full open position as indicated in FIG. 5, and vice versa. It is mounted off-center on the choke shaft 215 in such a manner as to be unbalanced by air flow to tend to move in the opening direction. It therefore tends to swing open in response to velocity of air flowing down through the carburetor and the differential in air pressures above and below the valve created by this air flow. The position of the choke valve 181 is also responsive to temperature, as has been described, and to intake manifold pressures. This latter means is incorporated in the choke housing, and comprises a choke cylinder 263 formed with a port 264 connected with a passage which leads posterior of the primary throttle valves 149. In the cylinder is a piston 265 connected by a link 266 with the crank arm 233. The cylinder has longitudinal slots such as indicated at 271 extending partway along the cylinder wall for by-passing air around the piston 265 when the piston has been moved outward far enough to uncover the inner ends of the slots. The difference in pressure on the opposite sides of the piston 265—that is, the difference between atmospheric pressure and near manifold vacuum—causes the piston to pull the choke valve partially open after the engine starts, and to cause air to circulate from the stove H through the line HT (see FIG. 2) to the interior of the housing 227 by way of connection 270 with the line HF.

The shaft 230 extends out of the thermostatic coil housing 227, and its outer end has fixed thereon a crank arm 273. A link 275 connects with this crank arm and with a crank arm 277 fixed to the primary throttle shaft 151 (see FIG. 19). This linkage is such that when the primary throttle shaft 151 is turned to open the primary throttles, it will, in turn, tend to rotate the shaft 230 in a counterclockwise direction, thus reducing the tension in the thermostatic coil 225, and consequently relaxing somewhat the closing force acting on the choke valve, if any.

Turning now to FIG. 19, the primary throttle shaft 151 has fixed thereon an inner arm 279 and an outer arm 277 which rotate together with the primary throttle shaft 151. Rotatably mounted on the shaft is an intermediate lever 280 (see FIG. 5) which carries a pair of oppositely facing lugs extending parallel to the shaft 151 and indicated by the reference characters 281 and 282. The lug 281 is held against a fixed lug 283, which lug is a part of the lever 279, and, of course, moves with the throttle shaft 151. The lugs 281 and 283 are held in contact by a coil spring 284 (see FIG. 5). The opposite ends of this coiled torsion spring are hooked around the lug 283 on the lever 279 fixed on the throttle shaft and the lug 282 on the rotatable lever 280. Throttle shaft 151 also carries a fourth lever 286. This lever in turn has a U-shaped inner end providing spaced apertured lugs which are rotatable on the throttle shaft 151 between which the torsion spring 284 is coiled. The lever 286 has a shoulder 287 against which the lug 282 can abut as it rotates in a counterclockwise direction. An arm 286 is in turn connected by a link 291 with a lever 293 having a cam surface 297, which lever 293 is secured to the secondary throttle shaft 201. Coil torsion spring 295 has one end engaging the lever 293 and the opposite end engaging lug 294 formed integral with the body of the carburetor. The arm 279 also carries a cam surface 299 which cooperates with cam surface 297.

The throttle mechanism just described will operate during opening movement of the primary throttle shaft 151 to move the lug 282 into engagement with the shoulder 287, which in turn rotates arm 286 and through link 291, lever 293, to rotate the secondary shaft 201 in a direction to open the secondary throttles. The lost motion between the lugs 282 and shoulder 287 provides for about 55 degrees opening of the primary throttles before actuation of the secondary throttles. In the remaining 20 degrees of opening movement of the primary throttles, the secondary throttles are rotated to full open position. If, however, the choke valve is still on, the latch above described (301) will be operative, in which case, opening movement of the primary throttles engages lug 282 and shoulder 287 after the primary throttles are 55 degrees open, and further movement, however, of the primary throttles is permitted without actuation of the secondary throttles, which will remain latched. This further movement of the primary throttles is possible due to the torsion spring connection between the lug 283 and the arm 282 on the driven lever 280. This torsion spring connection will yield, permitting full primary throttle opening. Of course, rotation of the lug 282 with respect to the lug 283 in the opposite direction is limited by the engagement between lugs 281 and 283. The surfaces 297 and 299 assure closing of the secondary throttle on closing of the primary.

Actuation of the primary throttles also operates an accelerating pump, such as shown at 185 in FIG. 9, through suitable linkage connected with the primary throttle and indicated generally by the reference character 310.

*Modified Form of Construction*

Figure 17:
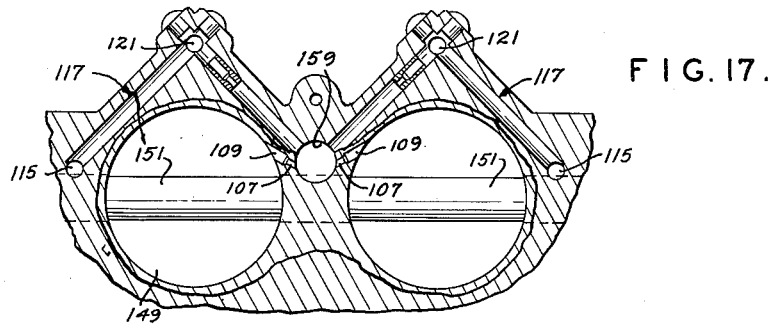
FIG. 17 is a transverse section of the modified form of the invention taken along the line 17—17 of FIG. 16.
Figure 16:
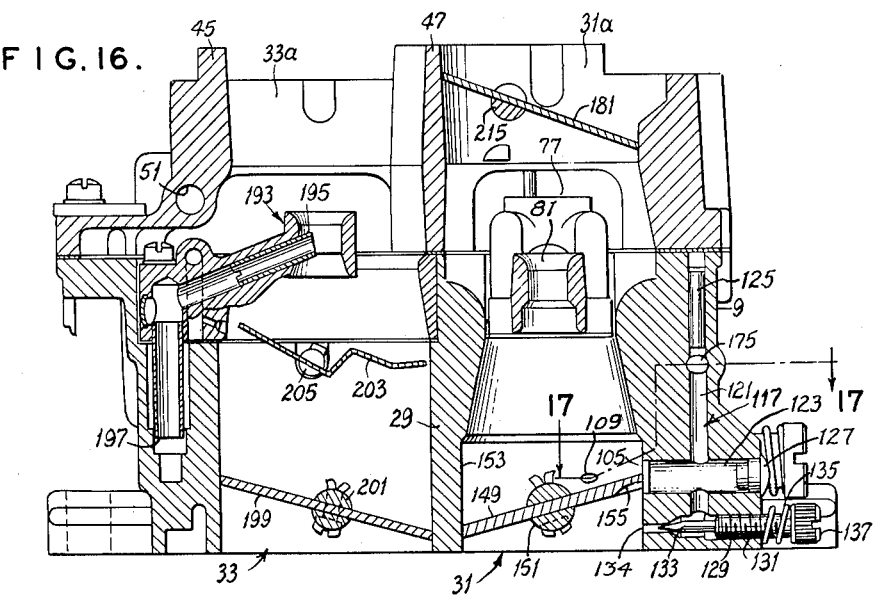
FIG. 16 is a section in elevation similar to FIG. 8, illustrating the second form of the invention.

FIGS. 15 to 17, inclusive, show a modified form of the invention in which the same reference characters indicate corresponding parts. This description will be limited to the differences only, rather than repetition of all parts of the previous description.

According to this modified form, it is possible to compensate for mixture differences due to pulsation in the low speed fuel metering circuit by connecting the idle bleed passages 109 with the idle by-pass system instead of with the idle system. Thus, in FIG. 15 the modification includes changing the location of the cross passage 163 to a position lower in the carburetor body, so that the bleed ports 109 and passage 107 connect to the passage 163 upstream of the idle adjustment screw 167. In this modification the bleeds 109 have no particular effect whatsoever upon mixture ratio in the idle range of throttle positions, or in the slightly off-idle range of throttle positions. However, as soon as the throttle 149 is open far enough to expose the ports 109 to engine pulsations, these pulsations will be transmitted to the idle by-pass passage 157, and thus back to the idle system through the idle passages 175. These pulsations will, in turn, affect mixture ratio delivered by the idle system to compensate for engine surging due to improper mixture ratio.

A construction has been described which will fulfill all of the objects of the invention, but it is contemplated that still other modifications will occur to those skilled in the art which come within the scope of the appended claims.

I claim:

1. A carburetor for an internal combustion spark ignition type of engine having a mixture conduit with an inlet and an outlet adapted to be connected to the engine intake manifold, a throttle valve pivotally mounted in said mixture conduit adjacent said outlet, a main venturi in said mixture conduit located upstream of said throttle valve, a high speed fuel metering circuit for said carburetor, a low speed fuel metering circuit for said carburetor interconnected with said high speed fuel metering circuit, a source of fuel connected to supply said metering circuits, and means for maintaining a substantially constant head of fuel in said source, said high speed fuel metering circuit for said carburetor comprising a fuel well supplied with fuel from said source, a series of interconnected passages including a fuel tube having an inlet in said well partially submerged in the fuel in said well under static conditions, a fuel nozzle forming an outlet for said passages, a metering restriction between said source and the lower inlet end of said fuel tube, an air bleed located to meter the flow of air and connected to supply air to said well between said fuel tube and the wall of said fuel well, a plurality of air bleeds along said passages communicating with said well and with atmosphere, a boost venturi connected with said fuel nozzle outlet for said passages for setting up a plurality of paths of circulation between said nozzle at the outlet of said passages and each of said bleeds, means to stabilize the fuel supply in said fuel well under operating conditions, said boost venturi having a diffuser section terminating in the throat section of said main venturi, the diffuser section of said boost venturi having a sharp divergent angle located below the fuel nozzle and a subtsantially cylindrical skirt forming a continuation thereof.

2. A carburetor for an internal combustion spark ignition type of engine having a mixture conduit with an inlet and an outlet adapted to be connected to an engine intake manifold, a throttle valve pivotally mounted in said mixture conduit adjacent the outlet, a venturi in said mixture conduit located upstream of said throttle valve, a high speed fuel metering circuit for said carburetor, a low speed fuel metering circuit for said carburetor interconnected with said high speed fuel metering circuit, a source of fuel connected to supply said metering circuits, and means for maintaining a substantially constant head of fuel in said source; said high speed fuel metering circuit comprising a fuel nozzle having its outlet tip in the throat section of said venturi, a fuel well extending upwardly in said carburetor and located so as to be partially fuel of fuel under static conditions, a main fuel passage connecting said fuel source with the lower end of said fuel well, a metered atmospheric vent connected with the upper end of said well above the fuel level therein, a main fuel siphon tube in said well having its lower end formed to provide a slip-fit with the walls of said fuel well about the circumference of said fuel tube below the fuel level in said fuel well under static conditions and having its upper outer portion in spaced relation to the walls of said fuel well to form an air passage under operating conditions, a substantially straight nozzle passage extending at an angle to said main fuel tube and connecting the upper open end of said main fuel siphon tube and said fuel nozzle, a plurality of mixing bleed holes in said main fuel siphon tube located below the static fuel level and adjacent the end of said main fuel tube having the slip-fit with the walls of said fuel well, a velocity bleed in said main fuel siphon tube located to direct a stream of air across said main fuel siphon tube and along said nozzle passage, and a pulsator dampening air bleed opening into said mixture conduit from said nozzle passage between said main fuel siphon tube and the tip of said nozzle.

3. A carburetor for an internal combustion spark ignition type of engine having a mixture conduit with an inlet and an outlet adapted to be connected to the engine intake manifold, a throttle valve pivotally mounted in said mixture conduit adjacent to said outlet, a main venturi in said mixture conduit located upstream of said throttle valve, a high speed fuel metering circuit for said carburetor, a low speed fuel metering circuit for said carburetor connecting with said high speed fuel metering circuit, a source of fuel connected to supply said metering circuits, and means for maintaining a substantially constant head of fuel in said source, said high speed fuel metering circuit comprising a fuel well supplied with fuel from said source, a series of interconnected passages including a fuel tube having an inlet in said well partially submerged in the fuel in said well under static conditions, a fuel nozzle forming an outlet for said passages in said mixture conduit, a metering restriction between said source and the inlet of said fuel tube, an air bleed located to meter the flow of air from said mixture conduit and connected to supply air to said well between said fuel tube and the wall of said fuel well, a plurality of air bleeds along said passages, a boost venturi connected with said fuel nozzle and forming an outlet for said passages for setting up a plurality of paths of circulating flow between said nozzle at the outlet of said passages and each of said air bleeds, means to stabilize the fuel supply in said fuel well under operating conditions, said boost venturi having a diffuser section terminating at the throat section of said main venturi, the diffuser section of said boost venturi having a sharp divergent angle immediately adjacent said fuel nozzle merging into a substantially cylindrical skirt, and an aspirating air bleed for said fuel passages extending downstream in said mixture conduit to an opening located adjacent the entrance section of said main venturi and eccentric in location with respect to said boost venturi.

4. A carburetor for an internal combustion spark ignition type of engine having a mixture conduit with an inlet and an outlet adapted to be connected to the engine intake manifold, a throttle valve pivotally mounted in said mixture conduit adjacent said outlet, a main venturi in said mixture conduit located upstream of said throttle valve, a high speed fuel metering circuit for said carburetor, a source of fuel connected to supply said high speed metering circuit, and means for maintaining a substantially constant head of fuel in said source, said high speed fuel metering circuit for said carburetor comprising a fuel well supplied with fuel from said source, a series of interconnected passages including a fuel tube having an inlet in said well partially submerged in the fuel in said well under static conditions, a fuel nozzle forming an outlet for said passages, a metering restriction between said source and the lower end of said fuel tube, a plurality of air bleeds along said passages, communicating with said fuel tube and with atmosphere directly, means for metering the supply of air to said well, a boost venturi connected with said fuel nozzle outlet for said fuel passages for setting up a plurality of paths of circulation between said nozzle outlet and each of said bleeds, said boost venturi having a diffuser section terminating in the throat section of said main venturi.

5. A carburetor for an internal combustion spark ignition type of engine having a mixture conduit with an inlet and an outlet adapted to be connected to the engine intake manifold, a throttle valve pivotally mounted in said mixture conduit adjacent said outlet, a main venturi in said mixture conduit located upstream of said throttle valve, a high speed fuel metering circuit for said carburetor, a low speed fuel metering circuit for said carburetor interconnected with said high speed fuel metering circuit, a source of fuel connected to supply said metering circuits, and means for maintaining a substantially constant head of fuel in said source, said high speed fuel metering circuit for said carburetor comprising a fuel well, supplied with fuel from said source, a series of interconnected passages including a fuel tube having an inlet at its open lower end with a slip-fit connection with the walls of said fuel well and arranged to be partially submerged in the fuel in said well under static conditions, a fuel nozzle forming an outlet for said passages, a metering restriction between said source and the open lower end of said fuel tube, an air bleed located to meter the flow of air and connected to supply air to said well between said fuel tube and the wall of said fuel well, a plurality of air bleeds located along said fuel passages, some of which are located in said well, and a boost venturi having a connection with said fuel nozzle outlet for said passages for setting up a plurality of paths of circulation between said fuel nozzle outlet and each of said bleeds, said boost venturi having a diffuser section with a sharp divergent angle located below the fuel nozzle and a substantially cylindrical skirt forming a continuation thereof.

6. A carburetor for an internal combustion spark ignition type of engine having a mixture conduit with an inlet and an outlet adapted to be connected to the engine intake manifold, a throttle valve pivotally mounted in said mixture conduit adjacent said outlet, a main venturi in said mixture conduit located upstream of said throttle valve, a high speed fuel metering circuit for said carburetor, a low speed fuel metering circuit for said carburetor interconnected with said high speed fuel metering circuit, a source of fuel connected to supply said metering circuits, and means for maintaining a substantially constant head of fuel in said source, said high speed fuel metering circuit for said carburetor comprising a fuel well, supplied with fuel from said source, a series of interconnected passages including a fuel tube having an open lower inlet end with a slip-fit in said fuel well and arranged to be partially submerged in the fuel in said well under static flow conditions, a fuel nozzle forming an outlet for said fuel passages, a metering restriction between said source and the open lower end of said fuel tube, an air bleed located to meter the flow of air and connected to supply air to said well between said fuel tube and the wall of said fuel well, a plurality of air bleeds located along said fuel passages, a boost venturi connected with the outlet of said fuel nozzle for setting up a plurality of paths of circulation between said nozzle and each of said bleeds, said boost venturi having a diffuser section terminating in the throat section of said main venturi, the diffuser section of said boost venturi having a sharp divergent angle located below the fuel nozzle and a substantially cylindrical skirt forming a continuation of said diffuser section.

7. A carburetor for an internal combustion spark ignition type of engine having a mixture conduit with an inlet and an outlet adapted to be connected to the engine intake manifold, a throttle valve pivotally mounted in said mixture conduit adjacent said outlet, a main venturi in said mixture conduit located upstream of said throttle valve, a high speed fuel metering circuit for said carburetor, a low speed fuel metering circuit for said carburetor interconnected with said high speed fuel metering circuit, a source of fuel connected to supply said metering circuits, and of means for maintaining a substantially constant head of fuel in said source; said high speed fuel metering circuit for said carburetor comprising a fuel well, supplied with fuel from said source, a series of interconnected fuel passages including a fuel siphon tube having an inlet end with a slip-fit connection with the walls of said fuel well and arranged to be partially submerged in the fuel in said well under static flow conditions, an air bleed located to meter the flow of air and connected to supply air to said well between the fuel tube and the wall of the fuel well above the lower end of said fuel siphon tube, a plurality of air bleeds located along said fuel passages, a boost venturi connected with the outlet of said fuel nozzle for setting up a plurality of paths of circulation between said nozzle and each of said bleeds, said boost venturi having a diffuser section terminating in the throat section of said main venturi, and an aspirating type of air bleed connected with said fuel passages and located at the throat of the main venturi in a position to be aspirated by the air flow through said mixture conduit so as to provide a fluctuation in bleeding effect during unsteady air inflow condition through said mixture conduit to damp the effect of air flow pulsation on said nozzle.

8. A carburetor for an internal combustion spark ignition type of engine having a mixture conduit with an inlet and an outlet adapted to be connected to the engine intake manifold, a throttle valve pivotally mounted in said mixture conduit adjacent said outlet, a main venturi in said mixture conduit located upstream of said throttle valve, a high speed fuel metering circuit for said carburetor, a low speed fuel metering circuit for said carburetor interconnected with said high speed fuel metering circuit, a source of fuel connected to supply said metering circuits, and a means for maintaining a substantially constant head of fuel in said source, said high speed fuel metering circuit for said carburetor comprising a series of interconnected passages, a fuel nozzle forming an outlet for said passages, a metering restriction between said source and the inlet end of said passages, a boost venturi connected with said fuel nozzle outlet for said passages, said boost venturi having a diffuser section terminating in the throat section of said main venturi, the diffuser section of said boost venturi having a sharp divergent angular portion located immediately below the fuel nozzle outlet and forming a rapid expansion zone therebelow and a substantially cylindrical skirt forming a continuation of said boost venturi diffuser section, and a connection from said high speed fuel metering circuit directly to the throat of said main venturi.

9. A carburetor for an internal combustion spark ignition type of engine having a mixture conduit with an inlet and an outlet adapted to be connected to the engine intake manifold, a throttle valve pivotally mounted in said mixture conduit adjacent said outlet, a main venturi in said mixture conduit located upstream of said throttle valve, a high speed fuel metering circuit for said carburetor, a low speed fuel metering circuit for said carburetor interconnected with said high speed fuel metering circuit, a source of fuel connected to supply said metering circuits, and means for maintaining a substantially constant head of fuel in said source, said high speed fuel metering circuit for said carburetor comprising a series of interconnected passages including an inlet connection with said source, a fuel nozzle forming an outlet for said passages, a boost venturi connected with said fuel nozzle outlet for said passages, said boost venturi having a diffuser section terminating in the throat section of said main venturi, the diffuser section of said boost venturi having a sharp divergent angle located below the fuel nozzle and a substantially cylindrical skirt forming a continuation of said boost venturi diffuser section, and an aspirating type of bleed for said fuel passages located adjacent said fuel nozzle, said aspirating type of bleed being located in the throat of the main venturi in a location to be aspirated by the air inflow to said main venturi at a point above the zone of fuel mixing, which air inflow produces a pulsating aspirating effect out of phase with the operation of the fuel nozzle.

References Cited in the file of this patent

UNITED STATES PATENTS

| | | |
|---|---|---|
| 2,621,911 | Lindsteadt | Dec. 16, 1952 |
| 2,750,168 | Winkler | June 12, 1956 |
| 2,796,243 | McDuffie | June 18, 1957 |
| 2,807,449 | Manning | Sept. 24, 1957 |
| 2,852,240 | Goodyear | Sept. 16, 1958 |
| 2,875,990 | Gretz | Mar. 3, 1959 |